(12) United States Patent
Borden et al.

(10) Patent No.: US 11,212,888 B2
(45) Date of Patent: Dec. 28, 2021

(54) VARIABLE HUE TASK LAMP WITH NOVEL HUE SELECTION COMPONENT

(71) Applicants: Peter Borden, San Mateo, CA (US); Michele Klein, Portola Valley, CA (US)

(72) Inventors: Peter Borden, San Mateo, CA (US); Michele Klein, Portola Valley, CA (US)

(*) Notice: Subject to any disclaimer, the term of this patent is extended or adjusted under 35 U.S.C. 154(b) by 13 days.

(21) Appl. No.: 16/840,371

(22) Filed: Apr. 4, 2020

(65) Prior Publication Data

US 2021/0315076 A1  Oct. 7, 2021

(51) Int. Cl.
*H05B 45/20* (2020.01)
*F21S 6/00* (2006.01)
*H05B 47/19* (2020.01)
*H05B 45/10* (2020.01)

(52) U.S. Cl.
CPC .............. *H05B 45/20* (2020.01); *F21S 6/006* (2013.01); *H05B 45/10* (2020.01); *H05B 47/19* (2020.01)

(58) Field of Classification Search
CPC ........ H05B 45/10; H05B 45/20; H05B 45/40; H05B 45/60; H05B 47/18; H05B 47/19; H05B 47/175; H05B 47/155; F21S 6/006; A61B 3/063; A61B 3/0008; A61B 3/066
See application file for complete search history.

(56) References Cited

U.S. PATENT DOCUMENTS

| | | | | |
|---|---|---|---|---|
| 8,779,681 | B2* | 7/2014 | Adler | H05B 31/50 315/291 |
| 9,820,643 | B2* | 11/2017 | Borden | A61B 3/063 |
| 9,924,584 | B2* | 3/2018 | Smith | H05B 47/19 |
| 2019/0320515 | A1* | 10/2019 | Sadwick | H05B 45/24 |

* cited by examiner

*Primary Examiner* — Haissa Philogene
(74) *Attorney, Agent, or Firm* — Pharar Patents & Intellectual Property; Andrew A. Pharar

(57) ABSTRACT

A variable hue task lamp with novel hue selection component is disclosed herein. The color and intensity of a task lamp is adjusted using a wireless connection from a device such as a smart phone, tablet, or computing device based upon an optimization method using a sample text or scene. The user first optimizes hue by adjusting the background color of the sample text or picture on the device. The optimum hue is then communicated to the task light, which sets light emitting diode intensities to match the optimum choice. Presets further localize choices in color space, and a comparison to white verifies the benefits of the chosen hue.

19 Claims, 3 Drawing Sheets

VARIABLE HUE TASK LAMP WITH NOVEL HUE SELECTION COMPONENT

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

TECHNICAL FIELD OF THE INVENTION

The present invention relates in general to lighting devices, and, more specifically, to a variable hue task lamp with novel hue selection component.

BACKGROUND OF THE INVENTION

Task lighting provides narrow and specific illumination, when desired, for such varied activities as reading, crafts, and fine work. Ambient lighting, by contrast, generally illuminates entire rooms, hallways, and other large areas.

Two important properties characterize lighting, namely: intensity and color. Intensity is the brightness of the light at the illuminated surface, and is commonly measured in units of lux. Color is the hue of the light, and may be either a single wavelength or a combination of wavelengths that defines a point in the Commission Internationale de l'Elcairage (CIE) color space. When discussing white and whitish light color is commonly associated with color temperature, ranging from warm to cold, measure in degrees Kelvin (° K). Task lamps typically span a range of about 2700° K to 7000° K.

Ambient lighting is available in both white and colored light. The Philips Hue bulb system, for example, combines light from red, green, and blue light emitting diodes (LEDs) to provide lighting in a wide range of hues, adjustable using a software application on a smart phone. A Philips Hue bulb placed in a desk lamp can provide task lighting in color.

Most lamps for task lighting are available in white light. Recently, lamps such as the Stella system combine light from white LEDs of different color temperatures to provide a selection of distinct color temperatures and a range of intensities. One Stella lamp model provides white light in three color temperatures with five intensities for each. Some models provide remote control of both the white color temperature and the intensity in discrete steps.

Smart devices such as e-readers and tablets are available with white and black backgrounds. The white background color temperature is sometimes adjustable to accommodate a user's preference or to control the amount of blue light emitted. For example, a user may wish to minimize the blue component of the background light while reading in the evening. This may be done by choosing a warmer color temperature for the white light.

It has been shown that colored light may reduce eye strain. For example, Goodrich, Borden, and Klein ("Can Color Improve Perceived Acuity," Envision Conference 2016, Wichita, Kans.) presented to subjects a system with variable color placed over an eye chart, and asked them to select the color that made the characters on the chart clearest. Notably, 38 of 40 subjects chose colors in the green/blue range, and none chose white.

A task lamp or e-reader with adjustable hue can minimize eye strain when reading or performing fine tasks, where the hue is adjusted to match an individual's preference. However, it is difficult to find the best hue because the color space visible to the human eye is three dimensional (red, green, blue), spanning millions of possible hues.

Thus, there is a need in the art for a variable hue task lamp with novel hue selection component that provides the benefits of hues other than white coupled with a simple means to select the hue that best minimizes eye strain, maximizes vision performance, and keeps the level of certain colors such as blue or red within desired levels. It is to these ends that the present invention has been developed.

BRIEF SUMMARY OF THE INVENTION

To minimize the limitations in the prior art, and to minimize other limitations that will be apparent upon reading and understanding the present specification, the present invention describes a variable hue task lamp with novel hue selection component.

It is an objective of the present invention to provide a variable hue task lamp with novel hue selection component that may optimize the background hue of reading material using a visual sample.

It is another objective of the present invention to provide a variable hue task lamp with novel hue selection component that may optimize the background hue of reading material by comparing to a standard reference.

It is another objective of the present invention to provide a variable hue task lamp with novel hue selection component that may optimize the background hue of reading material by comparing to white light.

It is another objective of the present invention to provide a variable hue task lamp with novel hue selection component that may optimize the background hue of reading material that may provide pre-set values of hues.

It is another objective of the present invention to provide a variable hue task lamp with novel hue selection component that may comprise a smart device.

It is another objective of the present invention to provide a variable hue task lamp with novel hue selection component that may comprise a smart phone.

It is another objective of the present invention to provide a variable hue task lamp with novel hue selection component that may comprise a smart tablet.

It is another objective of the present invention to provide a variable hue task lamp with novel hue selection component that may comprise an e-reader.

It is another objective of the present invention to provide a variable hue task lamp with novel hue selection component that may comprise a wireless connectivity.

It is another objective of the present invention to provide a variable hue task lamp with novel hue selection component that may comprise a visual output.

It is another objective of the present invention to provide a variable hue task lamp with novel hue selection component that may comprise a single-component construction.

It is another objective of the present invention to provide a variable hue task lamp with novel hue selection component that may comprise a multiple-component construction.

It is another objective of the present invention to provide a variable hue task lamp with novel hue selection component that may comprise a resilient material of construction.

It is another objective of the present invention to provide a variable hue task lamp with novel hue selection component that may comprise a cleanable material of construction.

It is another objective of the present invention to provide a variable hue task lamp with novel hue selection component that may comprise a reusable material of construction.

It is another objective of the present invention to provide a variable hue task lamp with novel hue selection component that may comprise an antimicrobial layer.

It is another objective of the present invention to provide a variable hue task lamp with novel hue selection component that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The illustrations of FIGS. 1-5 illustrate a variable hue task lamp with novel hue selection component, as contemplated by the present disclosure. The color and intensity of a task lamp is adjusted using a wireless connection from a device such as a smart phone, tablet, or computing device based upon an optimization method using a sample text or scene. The user first optimizes hue by adjusting the background color of the sample text or picture on the device. The optimum hue is then communicated to the task light, which sets light emitting diode intensities to match the optimum choice. Presets further localize choices in color space, and a comparison to white verifies the benefits of the chosen hue.

A novel feature differentiating this invention from prior art is the ability to select an optimum lamp hue on a device such as a smart phone, tablet, or personal computer (PC) by viewing the background hue of a visual sample that simulates properties of reading material or a task critical to optimizing visual performance. These properties can include features such as character size, contrast, and the color of an object. The optimized hue is communicated to the lamp, which contains a processor running an algorithm to duplicate the optimized hue by driving colored light emitting diodes (LEDs).

One embodiment additionally provides the ability to compare the selected background hue to a standard reference to verify the benefit of the optimized hue. An example of a standard reference is a white background of a set color temperature, such as 4500 degrees Kelvin (° K). Another example is a colored background that remains constant during the optimization process. Another example is a picture of a colored object such as a ball of yarn illuminated with 5000° K white light. The function of the standard reference is to enable the user to compare the effect of different hue choices against a hue that remains constant. This allows the user to verify that a newly selected hue, in fact, improves visual performance over that obtained with the standard reference.

Figure 1:
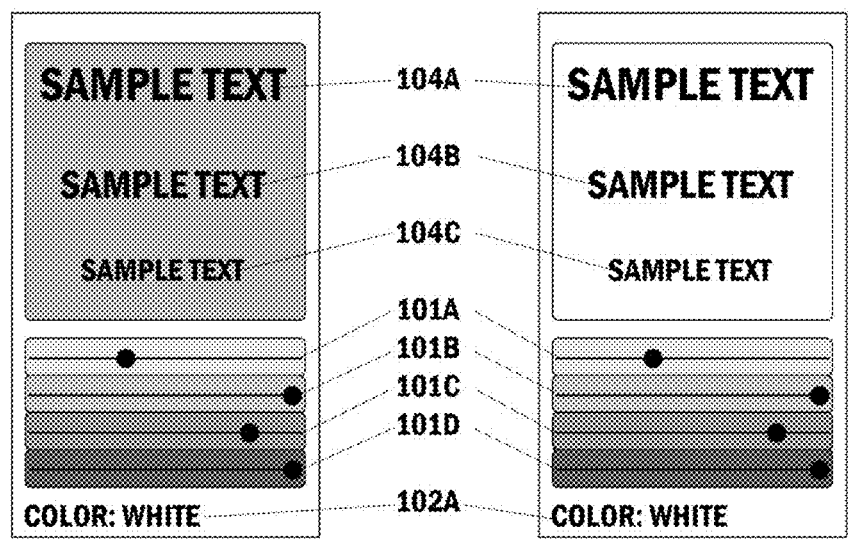
FIG. 1 illustrates a plurality of exemplary user interfaces of a variable hue task lamp with novel hue selection component, as contemplated by the present disclosure.
Figure 2:
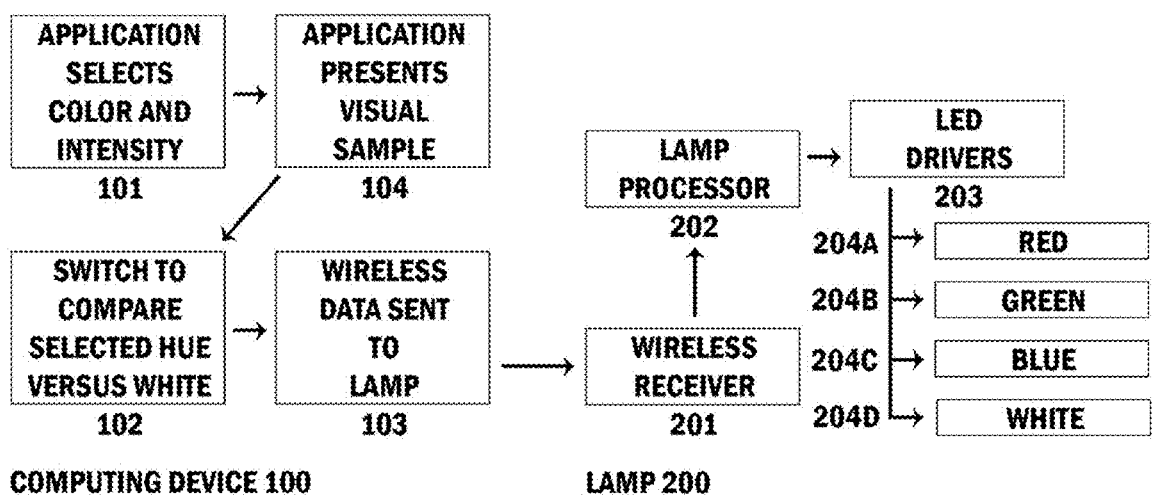
FIG. 2 schematically presents a system structure of a variable hue task lamp with novel hue selection component, as contemplated by the present disclosure.

FIG. 2 shows the structure of the primary embodiment of the system. There are two main elements: a computing device 100, such as a handheld, tablet, or PC, and a lamp 200. These communicate through wireless connection 103 using a protocol such as Bluetooth or wireless fidelity (Wi-Fi). The computing device runs an application software program 101 that presents one or more visual samples 104 to the user and provides controls that enable the user to vary the background color of the visual sample 104. The visual sample 104 may be text, an eye chart, or a picture of an activity illuminated by the lamp. In some embodiments, more than one visual sample is presented, as shown in FIG. 1. This has the benefit of allowing the user to gauge visual performance with more than one text block or character size. In some embodiments, the user has the ability to adjust the size of the text, characters, or features in the visual sample, so that the visual sample better matches the user's visual acuity.

In some embodiments, the app provides a switch 102 that allows the user to conveniently compare a selected hue to a standard reference background that remains constant during the process of selecting an optimum hue. This allows the user to gauge the benefits of the selected hue, such as improved acuity or decreased eye strain, compared to the standard reference. In one embodiment, the standard reference is white light. In some embodiments, the user can adjust the color temperature of the white light used as the standard reference.

The lamp 200 includes a wireless receiver 201 that receives signals from computing device 100. The receiver connects to processor 202 that provides signals to LED drivers 203 to control the intensity of LEDs with primary colors such as red 204A, green 204B, and blue 204B. In some embodiments, the lamp also includes white LEDs 204D. An algorithm in processor 202 or in computing device 100 determines the brightness of each primary color, such as red, green, or blue, so that the combination provides a hue that matches the hue chosen by the user.

As described above, the computing device runs an application software that presents a visual sample such as text or a picture of a task to the user. In one embodiment, the visual sample has optotypes, which are characters though but not necessarily letters, of different size, as with some eye charts. FIG. 1 shows an example. In the upper area are three visual sample blocks, 104A, 104B, and 104C, shown as text blocks with large, medium, and small characters. In some embodiments, the user has the ability to adjust the character size in each box to match their visual acuity. This allows the user to evaluate reading acuity and comfort versus background color with text ranging from easily read to challenging because of the size of the letters. The block below the visual samples has three slider controls 101A, 101B, and 101C to enable individual adjustment of the intensity of each of the primary colors that are combined to create the chosen hue, with red/green/blue (RGB) being the most common set of primaries, and a fourth slider 101D that adjusts the intensity of the three colors without changing the hue, which may be known as an alpha adjustment.

The background selector 102A toggles the background hue of the visual samples between the chosen hue as set with the sliders and white so that the user can see the effect of the chosen hue when compared to white light. Note that the example shown provides one color temperature; other embodiments may provide a choice of white color temperatures for the comparison, such as 3000° K, 4500° K, or 6000° K, or may provide hues other than white, such as a tint of green, red or blue. In one embodiment, the lamp hue changes in real-time with changes in the software application's hue settings. In another embodiment, a hue is chosen in the software application and sent to the lamp using a send control. In one embodiment, the output of the lamp becomes white when the background of the visual sample is set to white with the background selector 102A. In another embodiment, this screen additionally includes a control to turn the lamp on and off.

In other embodiments, the user can adjust the size of the characters in the blocks to suit their visual performance. In another embodiment, the user can also set the contrast, also known as the grey level, for the characters in the visual sample. Other embodiments present an eye chart whose optotypes may have different size or contrast.

The chosen hue is sent to the lamp, preferably using a wireless connection, although one embodiment includes a cable. The lamp has a plurality of LEDs that include more than one color, such as red, green, and blue (RGB). In one embodiment, the lamp also includes white LEDs to provide a mixture of colored and white light, often referred to as a tint. The lamp also has a processor 202, and driver circuits 203 that accept a digital output from the processor. The RGB and alpha values are sent from the wireless receiver to the processor, which drives the LEDs using a method such as pulse width modulation (PWM). The LEDs are driven in a manner so that the hue resulting from the combination of the lamp LEDs matches the hue seen on the screen of the computing device 100. In other embodiments, the lamp itself has additional controls to adjust the brightness or hue.

Note that in one embodiment the blue light component is separately adjustable and can be set to a low level, such as less than <20% of overall light intensity, or off completely, should the user want to minimize exposure to the blue portion of the spectrum.

In another embodiment, the computing device 100 itself runs a reading software program, enabling it to be used as a reading device, so there is no lamp 200 and the wireless connection to the lamp 103 is absent. The user has a capability to look at a visual sample and adjust the background hue of the visual sample to a chosen value. The visual sample can be a set of characters, such as a reading selection, an eye chart, or a picture. The reading software program then uses the chosen hue for the background of the reading material it presents. In one embodiment, the user can compare the background hue for a block of characters to indicate the difference between a white and colored background. In one embodiment, this comparison is done with reference to a visual sample. In another embodiment, this comparison is done with reference to a text selection on the reader.

The device may include preset values. The presets provide a starting point to reduce the extent of the color space in which the user needs to search to find an optimum hue. For example, the user may select a preset representing a desired condition, and then search for an optimum hue using controls 101A, 101B, 101C, and 101D. The presets may be pre-programmed, or may be set by the user. In one example, the device includes presets that provide hues likely to improve visual performance for people with various eye diseases, such as macular degeneration, glaucoma, or migraine. In another example, the presets provide hues that provide specific benefits, such as low blue content or reduced eye strain.

In another example, the presets may be pre-programmed or user programmed, and are appropriate for various activities, such as reading in the morning and reading in the evening. In another example, the presets correspond to various types of fabrics that the user works with. In one embodiment, the presets reside in the computing device and are communicated to the lamp. In another embodiment, the presets reside in the processor controlling the lamp, and are selected using controls on the lamp.

In the case of the e-reader, the presets may relate to various uses of the reader, such as extended reading with minimum eye strain, high acuity reading, minimum eye strain or best acuity with low or high blue light levels, or colors minimizing the effect of certain diseases such as migraine, macular degeneration, or glaucoma.

Figure 4:
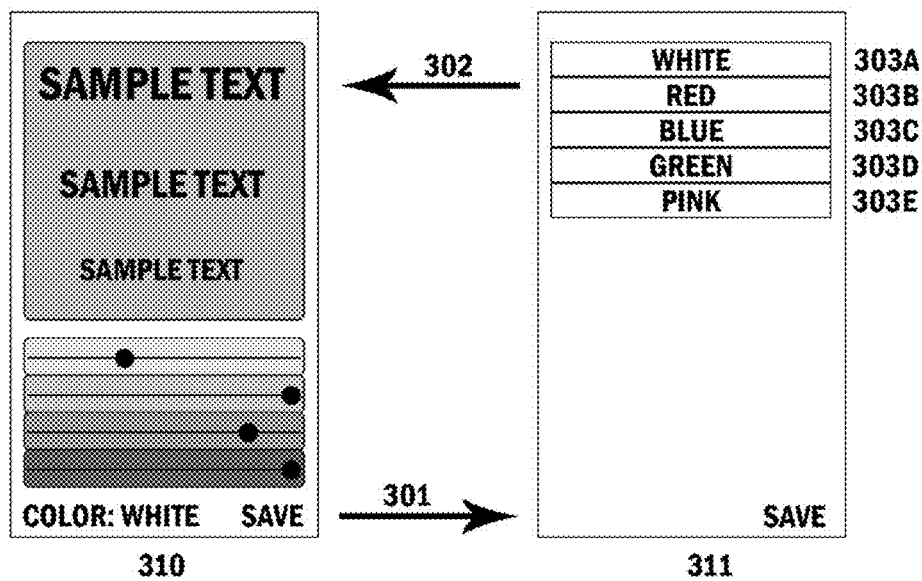
FIG. 4 illustrates a plurality of exemplary user interfaces of a variable hue task lamp with novel hue selection component, as contemplated by the present disclosure.

A unique feature of the invention is the presentation of each preset's associated color, so the user can easily identify a particular preset. This is shown in FIG. 4, in which both a name and a color are used to identify each preset. View 310 is the home screen, which includes the visual samples. At the bottom is a tab bar controller. Pressing the "save" button initiates a transition action 301 to the Saved Settings View 311, which includes a set of user-programmed presets 303A, 303B, 303C, 303D, and 303E. In this example, they are presented as cells in a table. Each cell has the same background color as its saved value. For example, cell 303B has a reddish saved color. It is indicated both with the name that the user provided, "red", and a reddish background color identical to its saved value. Pressing cell 303B in this example causes the visual samples to adopt the programmed reddish background color set action 302, and sends a signal to the lamp to emit the same reddish color. Note that preprogrammed presets, such as a preset corresponding to a particular disease as described above, may also have a background color that is the same as its saved value. For example, a preprogrammed preset for Macular Degeneration may have a light green color, and a cell in screen 311 may be labeled "Macular Degeneration" and have a light green background.

Figure 3:
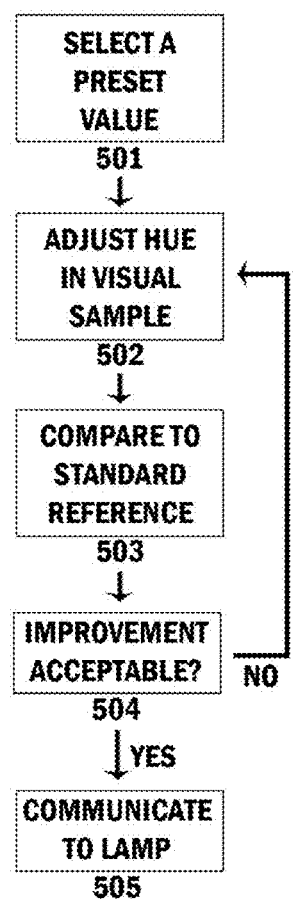
FIG. 3 schematically presents a flow chart of processes of a variable hue task lamp with novel hue selection component, as contemplated by the present disclosure.

FIG. 3 shows a flow chart of the process to optimize the hue of a lamp or e-reader. In step 501, the user optionally selects a preset as a starting point. This sets the primary color values to a point in color space that lies approximately where an optimum is expected to lie, greatly reducing the range over which the user needs to search. Next, in step 502 the user adjusts the hue in the visual sample to find a preferred hue. This may be compared to the standard reference in step 503 to see if the preferred hue is in fact a meaningful improvement. A decision is made in step 504: if the preferred hue is an improvement, this is communicated to the lamp or e-reader to set the background hue in step 505. Otherwise, the user returns to step 502 and readjusts the hue in the visual sample. Note that in some embodiments step 505, communication to the lamp, is done automatically in conjunction with the adjustment of the hue in step 502.

Figure 5:
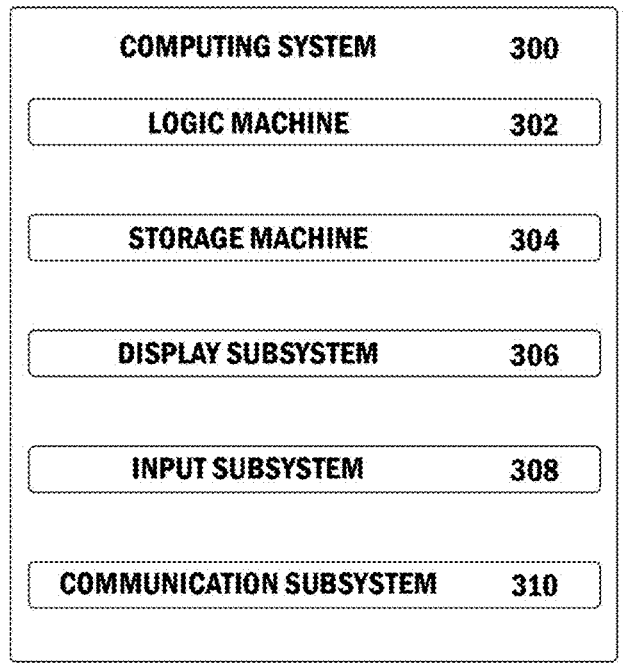
FIG. 5 schematically presents a computing system configured to carry out and actualize methods and tasks described herein, as contemplated by the present disclosure.

The illustration of FIG. 5 schematically presents a computing system that may represent an embodiment of the present invention. In some embodiments the method is executed on a computing system such as computing system 300. For example, storage machine 304 may hold instructions executable by logic machine 302 to provide the method to users.

Display subsystem 306 may display the various elements of the method to participants. For example, display subsystem 306, storage machine 304, and logic machine 302 may be integrated such that the method may be executed while being displayed on a display screen. The input subsystem 308 may receive user input from participants to indicate the various choices or user inputs described above.

The described method may be executed, provided, or implemented to a user on one or more computing devices via a computer-program product such as via an application programming interface (API). Computing system 300 may be any appropriate computing device such as a personal computer, tablet computing device, gaming device or console, mobile computing device, etc. Computing system 300 includes a logic machine 302 and a storage machine 304. Computing system 300 may include a display subsystem 306, input subsystem 308, and communication subsystem 310.

Logic machine 302 may execute machine-readable instructions via one or more physical devices. For example, the logic machine 302 may be configured to execute instructions to perform tasks for a computer program. The logic machine may include one or more processors to execute machine-readable instructions.

Storage machine 304 includes one or more physical devices configured to hold or store instructions executable by the logic machine to implement the method. When such methods and processes are implemented, the state of storage machine 304 may be changed to hold different data. For example, storage machine 304 may include memory devices such as various solid state memories, hard disk drives or CD or DVD devices.

Display subsystem 306 may visually present data stored on storage machine 304. For example, display subsystem 306 may visually present data to form a graphical user interface (GUI). Input subsystem 308 may be configured to connect and receive input from devices such as a mouse, keyboard, touch screen or gaming controller. Communication subsystem 310 may be configured to enable system 300 to communicate with other computing devices.

Communication subsystem 310 may include wired and/or wireless communication devices to facilitate networked communication.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

We claim:

1. A variable hue task lamp with novel hue selection component, comprising:
    a task lamp employing LEDs of more than one color;
    a remote computing device;
    a wireless connection between the task lamp and the remote computing device;
    an application software on the computing device that presents a visual sample;
    a means for adjusting a background color of the visual sample; and
    a processor running an algorithm for converting the background color of the visual sample to LED intensities that in combination enable a light from the task lamp to duplicate the background color presented in the visual sample on the computing device.

2. The variable hue task lamp of claim 1,
    wherein the task lamp includes red, green, and blue LEDs.

3. The variable hue task lamp of claim 1,
    wherein the computing device is a handheld or tablet computer.

4. The variable hue task lamp of claim 1,
    wherein the visual sample includes text.

5. The variable hue task lamp of claim 1,
    wherein the visual sample includes an eye chart.

6. The variable hue task lamp of claim 1,
    wherein the visual sample is a picture associated with a task.

7. The variable hue task lamp of claim 1,
    wherein an intensity of a plurality of primary colors associated with the background color of the visual sample is separately adjustable.

8. The variable hue task lamp of claim 1, further comprising:
    an algorithm running on the processor to compare a chosen background color for the visual sample to a standard reference background color.

9. The variable hue task lamp of claim 8,
wherein the standard reference background color is white light with a color temperature in the range of >2700° K to <7000° K.

10. The variable hue task lamp of claim 1,
wherein the blue component of a light is separately adjustable.

11. The variable hue task lamp of claim 1, further comprising:
a preset value of hues.

12. The variable hue task lamp of claim 11, further comprising:
preset values that relate to a plurality of disease conditions.

13. The variable hue task lamp of claim 11, further comprising:
preset values that are programmed by the user.

14. The variable hue task lamp of claim 11, further comprising:
preset values that relate to specific uses of the lamp.

15. The variable hue task lamp of claim 11,
wherein preset selection choices present the associated preset color.

16. A variable hue task lamp with novel hue selection component reading system, comprising:
a reading software program running on a computing device, the reading software program adjusting a background color of a visual sample;
an algorithm for using a chosen hue of the background of the visual sample as the hue of the background of a text presented by the reading software program; and
wherein the visual sample is a set of characters.

17. The variable hue task lamp of claim 16, further comprising:
a plurality of preset values related to specific uses of the reading system.

18. The variable hue task lamp of claim 16, further comprising:
an algorithm running on the processor for comparing a block of characters with a chosen background color to an identical block of characters with a standard reference background color.

19. The variable hue task lamp of claim 16,
wherein an intensity of a plurality of primary colors associated with the background color of the visual sample is separately adjustable.

* * * * *